US011825150B2

(12) United States Patent
Kim et al.

(10) Patent No.: US 11,825,150 B2
(45) Date of Patent: Nov. 21, 2023

(54) ELECTRONIC APPARATUS AND CONTROLLING METHOD THEREOF

(71) Applicant: SAMSUNG ELECTRONICS CO., LTD., Suwon-si (KR)

(72) Inventors: Hyungrae Kim, Suwon-si (KR); Cheulhee Hahm, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 95 days.

(21) Appl. No.: 17/439,199

(22) PCT Filed: Aug. 27, 2021

(86) PCT No.: PCT/KR2021/011502
§ 371 (c)(1),
(2) Date: Sep. 14, 2021

(87) PCT Pub. No.: WO2022/055161
PCT Pub. Date: Mar. 17, 2022

(65) Prior Publication Data
US 2023/0103441 A1  Apr. 6, 2023

(30) Foreign Application Priority Data

Sep. 14, 2020 (KR) .................. 10-2020-0117851
Feb. 25, 2021 (KR) .................. 10-2021-0025873

(51) Int. Cl.
*H04N 21/431* (2011.01)
*H04N 21/4223* (2011.01)
(Continued)

(52) U.S. Cl.
CPC ..... *H04N 21/4316* (2013.01); *H04N 21/4223* (2013.01); *H04N 21/44222* (2013.01); *H04N 21/4532* (2013.01); *H04N 21/4828* (2013.01)

(58) Field of Classification Search
CPC .......... H04N 21/4316; H04N 21/4223; H04N 21/44222; H04N 21/4532; H04N 21/4828
See application file for complete search history.

(56) References Cited

U.S. PATENT DOCUMENTS 9,294,710 B2  3/2016  Lim et al.
9,538,245 B2  1/2017  Cho et al.
(Continued)

FOREIGN PATENT DOCUMENTS

CN  101791466 A  8/2010
CN  106422208 A  2/2017
(Continued)

OTHER PUBLICATIONS

Communication dated Dec. 15, 2021, issued by the International Searching Authority in counterpart International Application No. PCT/KR2021/011502 (PCT/ISA/210 and PCT/ISA/237).

*Primary Examiner* — John R Schnurr
(74) *Attorney, Agent, or Firm* — Sughrue Mion, PLLC

(57) ABSTRACT

An electronic apparatus and a controlling method thereof are provided. The electronic apparatus includes a display, a memory configured to store at least one instruction, and a processor configured to control the electronic apparatus by executing at least one instruction stored in the memory, and the processor is configured to receive a user input for entering a first mode, perform a search based on a search word corresponding to a user history in a first application related to the first mode in response to the user input, and display a first image provided by the first application on a first area of the display based on a result of the search, and control the display to display a second image obtained through a camera connected to the electronic apparatus on a second area of the display.

16 Claims, 15 Drawing Sheets

(51) Int. Cl.
     *H04N 21/442*      (2011.01)
     *H04N 21/45*        (2011.01)
     *H04N 21/482*      (2011.01)

(56) References Cited

U.S. PATENT DOCUMENTS

| | | | |
|---|---|---|---|
| 10,839,954 B2 * | 11/2020 | Flavell | G16H 20/30 |
| 2011/0044602 A1 | 2/2011 | Lim et al. | |
| 2013/0298162 A1 | 11/2013 | Cho et al. | |
| 2018/0352303 A1 * | 12/2018 | Siddique | H04L 65/1069 |
| 2020/0359097 A1 * | 11/2020 | Yoo | H04N 21/25891 |
| 2021/0227288 A1 | 7/2021 | Jeon | |
| 2022/0072433 A1 * | 3/2022 | Wang | H04N 21/4854 |

FOREIGN PATENT DOCUMENTS

| | | |
|---|---|---|
| KR | 10-2009-0093309 A | 9/2009 |
| KR | 10-2018-0038135 A | 4/2018 |
| KR | 1020150057822 A | 5/2018 |
| KR | 1020190035026 A | 4/2019 |
| KR | 10-2019-0070145 A | 6/2019 |
| KR | 10-2004262 B1 | 7/2019 |
| KR | 10-2004264 B1 | 7/2019 |
| KR | 10-2019-0138366 A | 12/2019 |
| KR | 10-2054134 B1 | 12/2019 |
| KR | 10-2088673 B1 | 3/2020 |
| KR | 10-2097190 B1 | 4/2020 |

\* cited by examiner

ELECTRONIC APPARATUS AND CONTROLLING METHOD THEREOF

TECHNICAL FIELD

Aspects of the exemplary embodiments relate to an electronic apparatus and a controlling method thereof, and more particularly, to an electronic apparatus for displaying an image provided through a camera through other images and a controlling method thereof.

CROSS-REFERENCE TO RELATED APPLICATION

This application is based on and claims priority under 35 U.S.C. § 119 to Korean Patent Application No. 10-2020-0117851 filed on Sep. 14, 2020 in the Korean Intellectual Property Office and No. 10-2021-0025873 filed on Feb. 25, 2021, in the Korean Intellectual Property Office, the disclosure of which is incorporated by reference herein in its entirety.

BACKGROUND ART

Recently, with the development of electronic technology, a function of dividing a display screen of an electronic apparatus into several areas so as to allow a user to view various contents simultaneously is provided.

In addition, with the development of electronic technology, it is possible for a user to find a desired image easily using an application in an electronic apparatus.

Accordingly, there is a need for a multi-view function in which an image provided through a camera connected to the electronic apparatus is provided in one area of the display and a content desired by the user is provided in another area.

However, according to the related art, in order to execute the corresponding multi-view function, a user needs to connect to a camera and then, directly search for the content to be viewed in a video application and display the content, causing inconvenience.

Therefore, there is an increasing need for a technology that automatically plays the content suitable for the user when the multi-view function that displays a camera screen and a content screen is executed.

DISCLOSURE

Technical Problem

An aspect of the present disclosure is to provide an electronic apparatus capable of displaying an image obtained through a camera and a content corresponding to a user history simultaneously and a controlling method thereof.

Technical Solution

An electronic apparatus according to an exemplary embodiment includes a display, a memory configured to store at least one instruction, and a processor configured to control the electronic apparatus by executing at least one instruction stored in the memory, and the processor is configured to receive a user input for entering a first mode, based on the user input, perform a search based on a search word corresponding to a user history in a first application related to the first mode, and based on a result of the search, display a first image provided by the first application on a first area of the display, and control the display to display on a second area of the display, a second image obtained through a camera connected to the electronic apparatus.

The user history may include a basic search word corresponding to the first mode and a search history and a viewing history of a user in the first mode, and the processor may be configured to obtain the search word based on the user history of the first mode.

The processor may be configured to obtain the search word based on at least one keyword included in the search history, a time when an image in the viewing history is reproduced and at least one keyword corresponding to the image.

The processor may be configured to identify a first application from among a plurality of applications installed in the electronic apparatus based on the viewing history in the first mode.

The processor may be configured to obtain a playlist including a plurality of images corresponding to the search word by performing a search through the search word in the first application, and identify one image from among the plurality of images included in the playlist as the first image.

The processor may be configured to control the display to display a third image provided through another camera connected to the electronic apparatus on a third area that is different from an area of the display where the first image and the second image are displayed.

The processor may be configured to, based on a user input for executing a plurality of applications being received while operating in the first mode, control the display to display a screen provided by a second application that is different from the first application on a fourth area that is different from an area of the display where the first image and the second image are displayed.

The processor may be configured to, when the screen provided by the second application is displayed on the fourth area, stop displaying the second image and display a fourth image provided by the second application on the fourth area based on the result of the search.

The processor may be configured to, based on a user input for entering a second mode being received, perform a second search with a search word corresponding to a user history of the second mode in a third application related to the second mode, and based on a result of the second search, control the display to display an image provided by the third application on the first area and display the second image on the second area.

A method for controlling an electronic apparatus according to an exemplary embodiment includes receiving a user input for entering a first mode, performing, in response to the user input, a search based on a search word corresponding to a user history in a first application related to the first mode in response to the user input, and displaying on a first area of a display, a first image provided by the first application based on a result of the search, and displaying on a second area of the display, a second image obtained through a camera connected to the electronic apparatus.

The user history may include a basic search word corresponding to the first mode and a search history and a viewing history of a user in the first mode, and the performing a search may include obtaining the search word based on the user history of the first mode.

The obtaining may include obtaining the search word based on at least one keyword included in the search history, a time when an image in the viewing history is reproduced and at least one keyword corresponding to the image.

The performing a search may include identifying a first application from among a plurality of applications installed in the electronic apparatus based on the viewing history in the first mode.

The displaying may include obtaining a playlist including a plurality of images corresponding to the search word by performing a search through the search word in the first application, and identifying one image from among the plurality of images included in the playlist as the first image.

The method may further include displaying on a third area, a third image provided through another camera connected to the electronic apparatus, the third area being different from an area of the display where the first image and the second image are displayed.

The method may further include, based on a user input for executing a plurality of applications being received while operating in the first mode, control the display to display a screen provided by a second application that is different from the first application on a fourth area that is different from an area of the display where the first image and the second image are displayed.

The method may further include, based on a screen provided by the second application being displayed on the fourth area, stop reproducing the second image and produce a fourth image provided by the second application on the fourth area based on a result of the search.

The method may further include, based on a user input for entering a second mode being received, performing a search through a search word corresponding to a user history of the second mode through a third application related to the second mode, and based on a result of the search, displaying an image provided by the third application on the first area and displaying the second image on the second area.

According to the above-described various embodiments, when entering a multi-view mode, the electronic apparatus may provide an appropriate image in accordance with a user history together with an image obtained through a camera.

According to yet another exemplary embodiment, an electronic apparatus may include a display, at least one memory configured to store at least one instruction, and at least one processor configured to control the electronic apparatus by executing the at least one instruction stored in the at least one memory. The at least one processor may be configured to when a connection with a camera is established, display a user interface on the display, receive a user input selecting a first mode, perform a first keyword search in a first application related to the first mode using a search word obtained from a user history of the first application in response to the user input selecting the first mode, display a first image corresponding a result of the first keyword search on a first area of the display, and display a second image obtained through the camera connected to the electronic apparatus on a second area of the display.

The at least one processor may be further configured to receive a user input selecting a second mode and display a third image on a third area of the display.

The at least one processor may be further configured to display the first image, the second image, and the third image in a picture by picture (PBP) configuration.

Further, the at least one processor may be further configured to perform the first keyword search through an external server using the first application.

DESCRIPTION OF DRAWINGS

The above and other aspects, features, and advantages of certain embodiments of the present disclosure will be more apparent from the following description taken in conjunction with the accompanying drawings, in which.

BEST MODE

Hereinafter, the present disclosure will be described in detail with reference to accompanying drawings.

Figure 1:
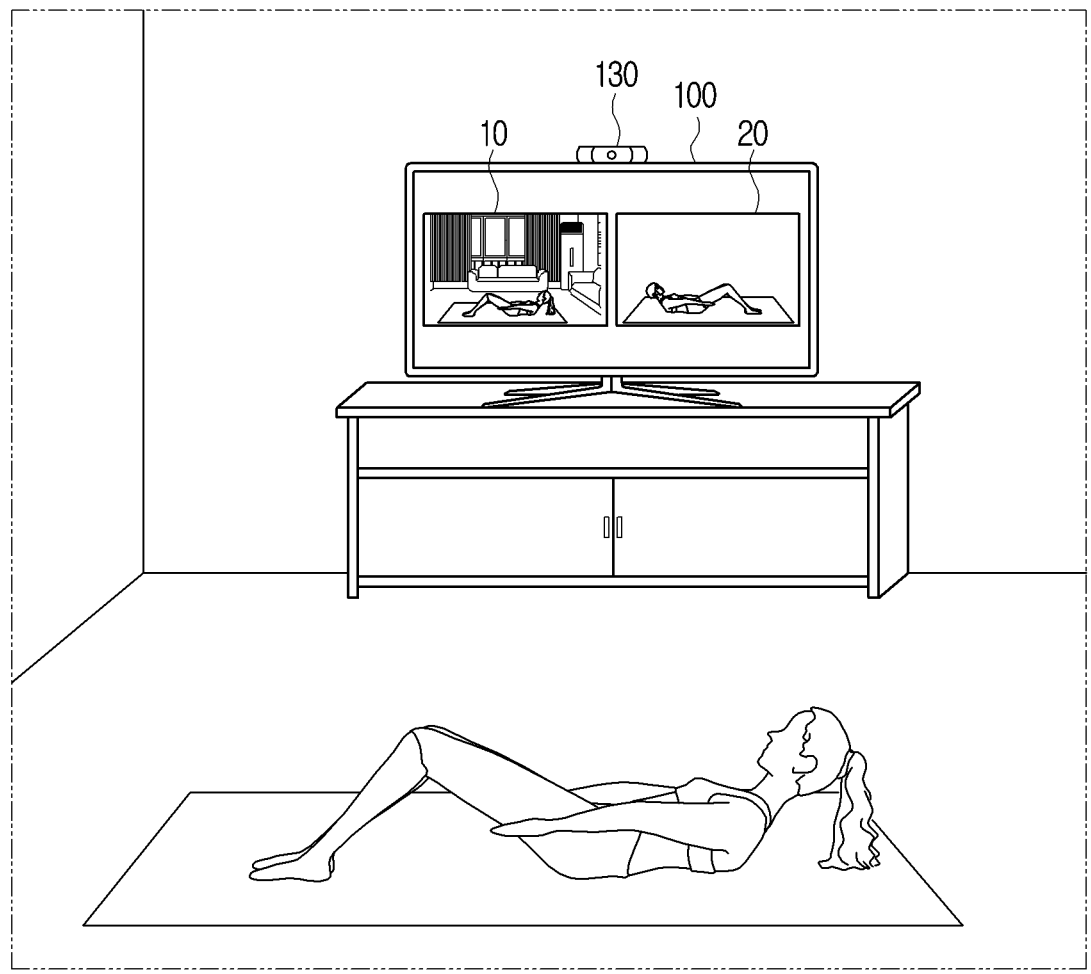
FIG. 1 is a view depicting a multi-view mode according to an exemplary embodiment.

FIG. 1 is a view depicting a multi-view mode according to an exemplary embodiment.

Referring to FIG. 1, when receiving a user input for entering a first mode, an electronic apparatus 100 may perform a search based on a search word (e.g. a keyword search) corresponding to a first mode through a first application related to the first mode.

According to an exemplary embodiment, the first mode may be a multi-view mode for displaying an image provided through a camera 130 and a screen provided by an application in the electronic apparatus 100 simultaneously. Here, the first mode may be referred to as a home training mode. A user input for entering the first mode may include various user inputs such as a user input for selecting an icon corresponding to the first mode displayed on a display of the electronic apparatus 100, a user input received through a remote controller connected to the electronic apparatus 100, a user input through a user's voice command, and a user input through the camera 130 connected to the electronic apparatus 100.

According to an exemplary embodiment, the first application is an application that performs a search and provides a content corresponding to a result of the search. For example, the first application may include various applications such as an application providing a streaming image, a video sharing application, a one-person media platform application, a video application for executing an image in the electronic apparatus 100, etc. The electronic apparatus 100 may perform a search through an external server using the first application and receive an image identified as a result of the search from the external server in a streaming method.

Specifically, when entering the first mode, the electronic apparatus 100 may perform a search through the first application based on a search word corresponding to the first mode.

According to an exemplary embodiment, the electronic apparatus 100 may perform a search through the first application based on a basic search word corresponding to the first mode. For example, the basic search word corresponding to the first mode which is a home training mode may be set as "home training." Such a basic search word may be preset by a manufacturer of the electronic apparatus 100, etc.

Accordingly, when a user input for entering the first mode is received, the electronic apparatus 100 may identify "home training" as the basic search word corresponding to the first mode through the first application and perform a search.

According to an exemplary embodiment, when a user history corresponding to the first mode is stored in a memory 110, the electronic apparatus 100 may obtain a search word corresponding to the user history of the first application, and perform a search using the obtained search word. The user history may include a search history, a viewing history, a purchase history of the user, etc. in the first mode. In other words, the electronic apparatus 100 may obtain a keyword suitable for the first mode based on the search history and viewing history of the user of the electronic apparatus 100 during the first mode operation. Subsequently, the electronic apparatus 100 may perform a search using the obtained search word and display a first image 20 provided by the first application on a first area.

In other words, if there is no user history of the first mode, the electronic apparatus 100 may perform a search in the first application through a basic search word corresponding to the first mode. Alternatively, if there is a user history of the first mode, the electronic apparatus 100 may obtain a search word based on the user history of the first mode and perform a search in the first application through the obtained search word.

The electronic apparatus 100 may display the first image 20 provided by the first application based on a result of the search on the first area of the display, and display a second image 10 provided through the camera 130 connected to the electronic apparatus 100 on a second area of the display.

FIG. 1 illustrates that the first image and the second image are displayed in a Picture By Picture (PBP) method, but the present disclosure is not limited thereto. The first image and the second image may be displayed in a Picture In Picture (PIP) method as illustrated in FIGS. 4B and 4C.

In addition, FIG. 1 illustrates that two images provided by the camera and the first application are displayed simultaneously, but the present disclosure is not limited thereto. A plurality of images provided by the camera and a plurality of applications may be displayed simultaneously.

FIG. 1 illustrates that the camera 130 is an external component of the electronic apparatus 100, but the present disclosure is not limited thereto. The electronic apparatus 100 may include an integrated camera. According to the above-described exemplary embodiment, when entering the first mode, the electronic apparatus 100 may identify an image corresponding to a user history, and provide the image together with an image provided by a camera.

Figure 2:
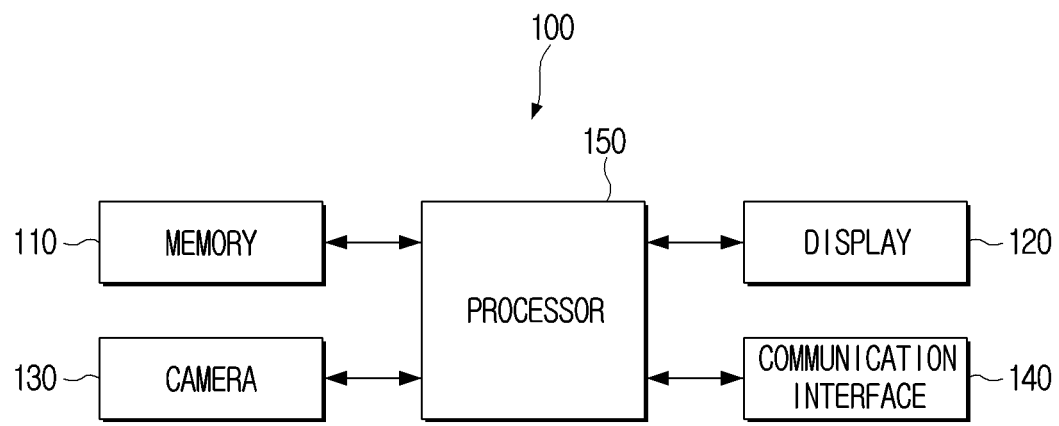
FIG. 2 is a block diagram depicting a configuration of an electronic apparatus according to an exemplary embodiment.

FIG. 2 is a block diagram depicting configuration of an electronic apparatus according to an exemplary embodiment. The electronic apparatus 100 according to an exemplary embodiment may be implemented as various display devices such as TV, smart TV, monitor, electronic album, electronic blackboard, electronic table, notebook computer, etc.

Referring to FIG. 2, the electronic apparatus 100 according to an exemplary embodiment may include the memory 110, a display 120, a camera 130, a communication interface 140, and the processor 150.

The memory 110 may include at least one instruction regarding the electronic apparatus 100. In addition, the memory 110 may store an Operation System (O/S) for driving the electronic apparatus 100. Further, the memory 110 may store various software programs and applications for the electronic apparatus 100 to operate according to various embodiments. In addition, the memory 110 may include a semiconductor memory such as a flash memory or a magnetic storage medium such as a hard disk.

Additionally, the memory 110 may include various software modules for the electronic apparatus 100 to operate according to various embodiments, and the processor 150 may control the operation of the electronic apparatus 100 by executing various software modules stored in the memory 110. In other words, the memory 110 may be accessed by the processor 150, and reading/recording/modifying/deleting/updating, etc. of data stored on the memory 110 may be performed by the processor 150.

Meanwhile, in the present disclosure, the term of the memory 110 may refer to the memory 110, a ROM (not illustrated) in the processor 150, a RAM (not illustrated) or may include a memory card (not illustrated) (e.g., a micro SD card, a memory stick, etc.) mounted on the electronic apparatus 100.

In particular, the memory 110 according to an exemplary embodiment may store a user history of the first mode. Specifically, while being operated in the first mode, the memory 110 may store information regarding the search history and viewing history of a user.

The display 120 may display various images. The images may correspond to a concept including images and videos, and the display 120 may display various images such as broadcasting content, multi-media content, etc. In addition, the display 120 may display a image that is provided through the camera 130. Further, the display 120 may display various user interfaces (UI) and icons.

The display 120 may be implemented as displays in various forms such as Liquid Crystal Display (LCD) panel, light emitting diode (LED), Organic Light Emitting Diodes (OLED), Liquid Crystal on Silicon (LCoS), Digital Light Processing (DLP), etc. In addition, the display 120 may also include a driving circuit, a backlight circuit, etc. that can be implemented in the form of a-si TFT, low temperature poly silicon (LTPS) TFT, organic TFT (OTFT), etc.

In addition, the display 120 may be combined with a touch sensor to be implemented as a touch screen.

The camera 130 is configured to photograph an environment where the electronic apparatus 100 is located. The electronic apparatus 100 may obtain an image that captures a user in the environment where the electronic apparatus 100 is located through the camera 130. FIG. 2 illustrates that the camera 130 is a component of the electronic apparatus 100, but the present disclosure is not limited thereto. The electronic apparatus 100 may be connected to an external camera and may display an image obtained from the external display on the display 120.

The communication interface 140 is configured to communicate with various types of external apparatuses according to various types of communication methods. The communication interface 140 may include a WiFi chip, a Bluetooth chip, a wireless communication chip, and a near field communication (NFC) chip. The processor 150 may perform communication with various types of external apparatuses or external servers using the communication interface 140.

In particular, the WiFi chip and the Bluetooth chip perform communication via a WiFi method and a Bluetooth method, respectively. In the case of using the WiFi chip or the Bluetooth chip, various connection information such as a Service Set Identifier (SSID), a session key, etc. may be transmitted and received first to establish the communication with the external apparatus or server. Then various kinds of information may be transmitted and received. The wireless communication chip refers to a chip that performs communication according to various communication standards such as IEEE, Zigbee, 3rd Generation (3G), 3rd Generation Partnership Project (3GPP), Long Term Evolution (LTE), etc. The NFC chip refers to a chip which operates in a Near Field Communication (NFC) method using a 13.56 MHz band among various RF-ID frequency bands such as 135 kHz, 13.56 MHz, 433 MHz, 860-960 MHz, 2.45 GHz, etc.

The communication interface 140 may perform communication with an external server and my receive a search result corresponding to a search word corresponding to a user history from the external server through a first application. In addition, the communication interface 140 may receive an image provided by the first application according to the search result in a streaming method.

The processor 150 is electrically connected to the memory 110 and may control various operations and functions of the electronic apparatus 100. The processor 150 controls the overall operations of the electronic apparatus 100. The processor 150 may include one or more of a central processing unit (CPU), an application processor (AP), or a communication processor (CP). The processor 150 may be implemented in various manners. For example, the processor 150 may be implemented by at least one of an application specific integrated circuit (ASIC), an embedded processor, a microprocessor, a hardware control logic, a hardware finite state machine (FSM), or a digital signal processor (DSP). Meanwhile, in the disclosure, the term "processor" 150 may be used as the meaning including a central processing unit (CPU), a graphic processing unit (GPU), a main processing unit (MPU), and the like.

The processor 150 may drive an operating system or an application program to control hardware or software components connected to the processor 150, and may perform various types of data processing and calculation. In addition, the processor 150 may load and process commands or data received from at least one of the other components into a volatile memory, and store various data in a non-volatile memory.

In particular, the processor 150 may receive a user input for entering the first mode. The user input for entering the first mode may be various user inputs such as a user input of selecting an icon corresponding to the first mode displayed on the display 120 of the electronic apparatus 100, a user input received through an external remote controller connected to the electronic apparatus 100, a user input through a user's voice command, and a user input through the camera 130 connected to the electronic apparatus 100.

The first mode may be a mode for displaying an image provided through the camera 130 and a screen provided by an application in the electronic apparatus 100 simultaneously. For example, if the first mode is a home training mode, the processor 150 may display a content image provided through an application for providing a home training image on a first area of the display 120 while displaying an image obtained through the camera 130 on a second area of the display 120.

Specifically, the processor 150 may perform a search based on a search word corresponding to the first mode through a first application related to the first mode in response to a user input for entering the first mode.

According to an exemplary embodiment, a search word corresponding to the first mode may be a preset basic search word corresponding to the first mode.

According to an exemplary embodiment, a search word corresponding to the first mode may be a search word that is obtained based on a user history of the first mode. The user history may include a user's search history and viewing history in the first mode, and the processor 150 may obtain a search word based on the user's past search history and viewing history while operating in the first mode.

According to an exemplary embodiment, the processor 150 may identify the first application from among a plurality of applications installed in the electronic apparatus 100 based on the viewing history in the first mode. For example, an application most used in the first mode from among the plurality of applications installed in the electronic apparatus 100 may be identified as the first application. For example, if the first mode is a home training mode, the processor 150 may perform a search through the first application that is most used in the home training mode.

When entering the first mode, the processor 150 may obtain a search word corresponding to a user history of the first application. For example, the processor 150 may obtain a search word based on at least one keyword included in a user's search history in the first mode and at least one keyword corresponding to a time when images in a viewing history are reproduced in the first mode. The specific method for obtaining a search word by the processor 150 will be described later with reference to FIG. 5.

The processor 150 may perform a search using a search word obtained based on a basic search corresponding to the first mode or a user history. The processor 150 may then control the display 120 to display the first image provided by the first application on the first area of the display 120. If there is no user history of the first mode, the processor 150 may perform a search in the first application through a basic search word corresponding to the first mode. If there is a user history of the first mode, the processor 150 may obtain a search word based on a user history of the first mode and perform a search in the first application using the obtained search word.

For example, the processor 150 may receive a search result corresponding to a search word through the communication interface 140, and while receiving the first image provided based on the search result, control the display 120 to display the first image on the first area of the display 120.

According to an exemplary embodiment, the processor 150 may perform a search through a search word in the first application and obtain a playlist including a plurality of images corresponding to the search word. The processor 150 may identify one of the plurality of images included in the playlist as the first image.

The processor 150 may display the identified first image on the first area of the display 120, and control the display 120 to display the second image obtained through the camera 130 on the second area of the display 120.

For example, the processor 150 may display the first image and the second image together in various display methods such as a Picture In Picture (PIP) method, a Picture By Picture (PBP) method, etc., which will be described in detail with reference to FIGS. 4A to 4C.

In the above-described exemplary embodiment, the first image and the second image are displayed on the first area and the second area, respectively, in the first mode, but the present disclosure is not limited thereto.

According to an exemplary embodiment, the processor 150 may control the display 120 to display a third image obtained through a camera that is different from the camera 130 on a third area that is different from the areas of the display 120 where the first image and the second image are displayed while displaying the first image and the second image. The third image may be obtained through a camera connected to a an electronic device separate from the electronic apparatus 100 or may be obtained through another camera that is connected to the electronic apparatus 100.

According to an exemplary embodiment, the processor 150 may control the display 120 to further display a second application that is different from the first application on a fourth area that is different from the area of the display 120 where the first image and the second image are displayed while displaying the first image and the second image on the display 120. When the second application is displayed on the fourth area, the processor 150 may stop reproducing the second image, and control the display 120 to reproduce a fourth image provided by the second application based on a search result of the fourth area.

In addition, according to an exemplary embodiment, the processor 150 may perform a search based on a search word corresponding to a second mode that is different from the first mode, and control the display 120 to display an image that is provided based on a result of the search on the first area of the display 120 and display the second image obtained through the camera 130 on the second area of the display 120. In other words, when a user input for entering the second mode is received, the processor 150 may perform a search using a search word corresponding to a user history of the second mode through a third application related to the second mode, and may control the display 120 to display an image provided by the second application based on a result of the search of the first area and display the second image obtained through the camera 130 on the second area.

Figure 3:
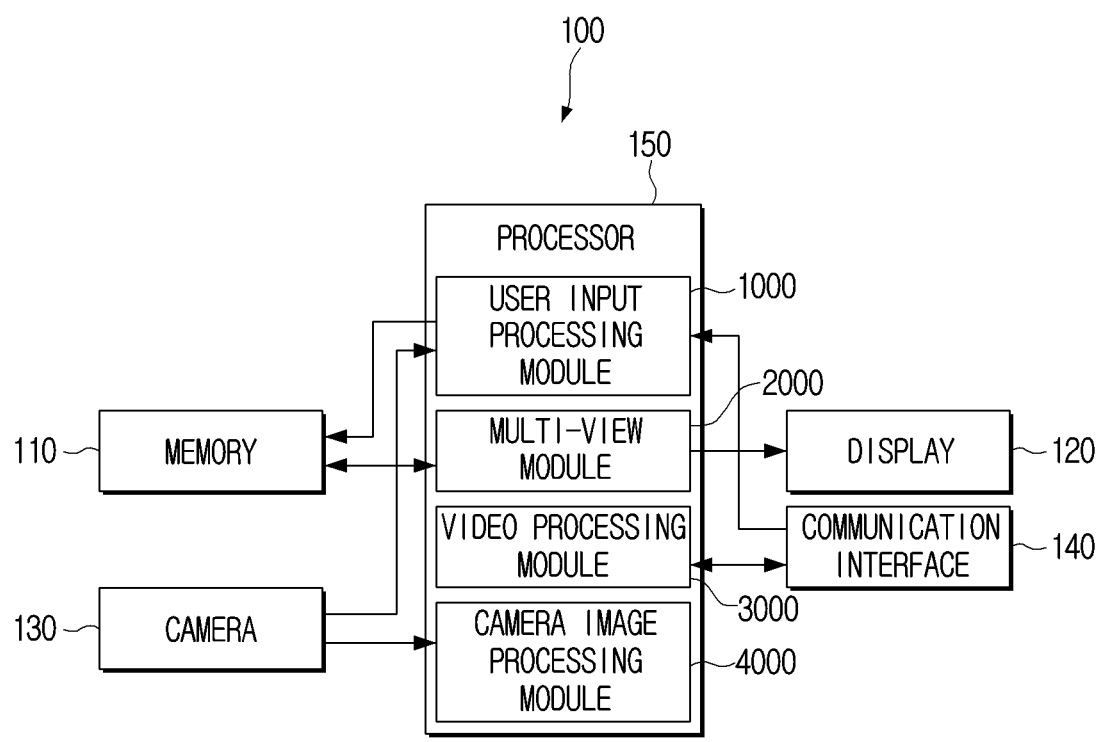
FIG. 3 is a view depicting a plurality of modules for performing a multi-view mode according to an exemplary embodiment.

FIG. 3 is a view depicting a plurality of modules for performing a multi-view mode according to an exemplary embodiment.

According to an exemplary embodiment, a multi-view mode may be performed using a plurality of modules (1000 to 4000) included in the processor 150 as illustrated in FIG. 3. Although a plurality of modules for performing a multi-view mode may be included in the electronic apparatus 100, this is only an example. Some of the plurality of modules (1000 to 4000) may be included in an external server.

As described above, the plurality of modules (1000 to 4000) may be positioned in the processor 150, but the present disclosure is not limited thereto. The plurality of modules (1000 to 4000) may be positioned in the memory 110. When the plurality of modules (1000 to 4000) are positioned in the memory 110, the processor 150 may load the plurality of modules (1000 to 4000) from a non-volatile memory onto a volatile memory and execute each function of the plurality of modules (1000 to 4000). Here, the loading means the operation of calling data stored in the non-volatile memory and storing the data so that the processor 150 can access the data.

A user input processing module 1000 is configured to receive a user input for entering a multi-view mode. The user input for entering the multi-view mode may include various user inputs such as a user input that is received from an external remote controller through the communication interface 140, a user motion input that is obtained through the camera 130, a user input that is obtained through the camera 130, a user input that is input through a UI displayed on the display 120, a user's voice command input, a user input for selecting an icon corresponding to the multi-view mode, etc.

The multi-view mode according to an exemplary embodiment may include a plurality of modes. For example, the multi-view mode may include the first mode which is a home training mode and the second mode which is a dance mode. In this case, the user input processing module 1000 may identify a multi-view mode corresponding to a user input from among the plurality of multi-view modes based on the user input.

When a user input for entering the multi-view mode is received, the user input processing module 1000 may activate a multi-view module 2000, a video processing module 3000, and a camera image processing module 4000.

The multi-view module 2000 is a module for providing both the first image provided through the video processing module 3000 and the second image provided through the camera image processing module 4000 together on the display 120.

When entering the multi-view mode, the multi-view module 2000 may identify a search word corresponding to the multi-view mode.

According to an exemplary embodiment, the multi-view module 2000 may identify a basic search word corresponding to the multi-view mode. The basic search word corresponding to the multi-view mode may be preset by a manufacturer of the electronic apparatus 100 or a developer of the multi-view mode.

According to an exemplary embodiment, a search word related to the multi-view mode may be identified based on a search word database (DB) pre-stored in the memory 110.

The search word DB is a DB where a user's search history and viewing history information in the multi-view mode is stored, and if the multi-view mode includes a plurality of modes, the user's search history and viewing history information regarding each mode may be stored therein.

According to an exemplary embodiment, while operating in the first mode which is a home training mode, if a user searches for "morning yoga" and views a video regarding "morning yoga", the history of searching for "morning yoga" and the history of viewing the video of "morning yoga" may be stored in the search word DB as information regarding the first mode. In addition, while operating in the second mode which is a dancing mode, if a user searches for "basic dance" and views a video regarding "easy dance", the history of searching for "basic dance" and the history of viewing the video of "easy dance" in the second mode may be stored in the search word DB as information related to the second mode.

The multi-view module 2000 may identify a search word corresponding to an image suitable for the multi-view module based on the search history and viewing history stored in the search word DB. For example, if a user has a lot of history of watching a video related to "morning yoga" in the morning in the first mode, when a user input for entering the first mode is received in the morning, the multi-view module 2000 may identify "morning yoga" as a search word corresponding to the first mode.

In other words, if a user history corresponding to the multi-view mode is stored in the search word DB, the multi-view module 2000 may obtain a search word based on at least one keyword obtained based on a search history included in the user history (e.g., morning, yoga), a time when an image in a viewing history included in the user history was reproduced (e.g., morning), or a keyword corresponding to an image included in the user history (e.g., morning yoga).

When a search word corresponding to the multi-view mode is identified, the multi-view module 2000 may transmit the obtained search word to the video processing module 3000. If a user history corresponding to the multi-view mode is not stored in the search word DB, the multi-view mode 2000 may transmit a basic search word corresponding to the multi-view mode to the video processing module 3000.

The video processing module 3000 is a module for providing an image corresponding to a search word through an application corresponding to the multi-view module 2000.

When receiving a search word from the multi-view module 2000, the video processing module 3000 may identify an application to perform a search from among a plurality of applications installed in the electronic apparatus 100. For example, the video processing module 3000 may identify an application most used by a user in the first mode as the first application corresponding to the first mode.

When an application to perform a search is identified, the video processing module 3000 may obtain a playlist including a plurality of images corresponding to a search word from an external server through the communication interface 140 using the identified application. Alternatively, the video processing module 3000 may obtain a playlist including a plurality of images corresponding to a search word through an internal video DB in a memory. The internal video DB may be a DB that stores a plurality of images pre-stored in the electronic apparatus 100. In other words, the first application may be an application capable of streaming images from an external server, but is not limited thereto. The first application may be an application capable of searching for and reproducing internal videos.

The video processing module 3000 may provide one of the plurality of images included in the playlist to the multi-view module 2000 as the first image. For example, the video processing module 3000 may provide an image located at the top of the playlist from among the plurality of images included in the playlist to the multi-view module 2000 as the first image. However, the present disclosure is not limited thereto, and an algorithm that identifies the first image from among the plurality of images included in the playlist may be preset by a user. For example, an image having the highest number of views or an image having the highest number of recommendations may be preset to be identified as the first image. Alternatively, according to an exemplary embodiment, the video processing module 3000 may not identify the first image automatically, and may provide a full playlist to the multi-view module 2000 so that the first image can be selected according to a user's selection.

The camera image processing module 4000 is a module for providing an image obtained through the camera 130. When the camera image processing module 4000 is activated by the user input processing module 1000, the camera image processing module 4000 may provide the second image photographed by a user through the camera 130 to the multi-view module 2000.

When the multi-view module 2000 receives the first image from the video processing module 3000 and receives the second image from the camera image processing module 4000, the display 120 may be controlled to display the first image on the first area of the display 120 and display the second image on the second area of the display 120. For example, when receiving the first image from the video processing module 3000, the multi-view module 2000 may control the display 120 to display the first image on the first area in a streaming method and display the second image capturing the user, which is received from the camera image processing module 4000, on the second area in real time.

The multi-view module 2000 may control the display 120 to display the first image and the second image in a PIP method or a PBP method. When images are provided through two cameras, the multi-view module 2000 may receive images obtained through the first camera and the second camera from the camera image processing module 4000, and may control the display 120 to display the image obtained through the first camera on the second area of the display 120 while displaying the first image on the first area and the image obtained through the second camera on the third area that is different from the area of the display 120 where the first image and the second image are displayed. In this case, the multi-view module 2000 may control the display 120 to display the first image, the second image and the third image in a PIP method or a PBP method.

In the above-described exemplary embodiment, the image is provided through one application is displayed on the display 120, but the present disclosure is not limited thereto. While operating in the multi-view mode providing the first image and the second image, when a user input for executing a plurality of applications through the user input processing module 1000 is received, the video processing module 3000 may transmit the screen provided through the second application that is different from the first application to the multi-view module 2000, together with the first image provided through the first application. The multi-view module 2000 may divide the first area and the second area of the existing display 120 into three areas, and may control the display 120 to display the first image, the screen provided through the second application and the second image on each area.

If a user input for performing a search is received through the first application while the first image and the second image are displayed together through the multi-view module 2000, the multi-view module 2000 may perform a search according to the user input received in the first application. The user input for performing a search may be various user inputs such as a user input for selecting a search icon in the first application, a user's voice command input, etc. When a search is performed according to a user input, the display 120 may be controlled to display an image corresponding to a search result of the first area of the display 120. The multi-view module 2000 may store a search word based on which a search is performed and an image corresponding to a search result in a search word DB.

Figure 4A:
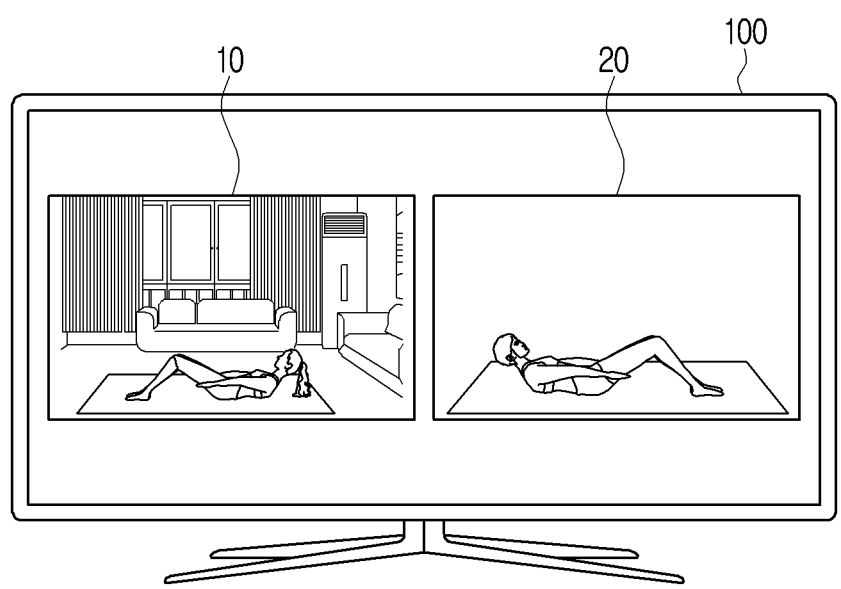
FIG. 4A is a view illustrating a first image and a second image provided in a Picture By Picture (PBP) method according to an exemplary embodiment.
Figure 4B:
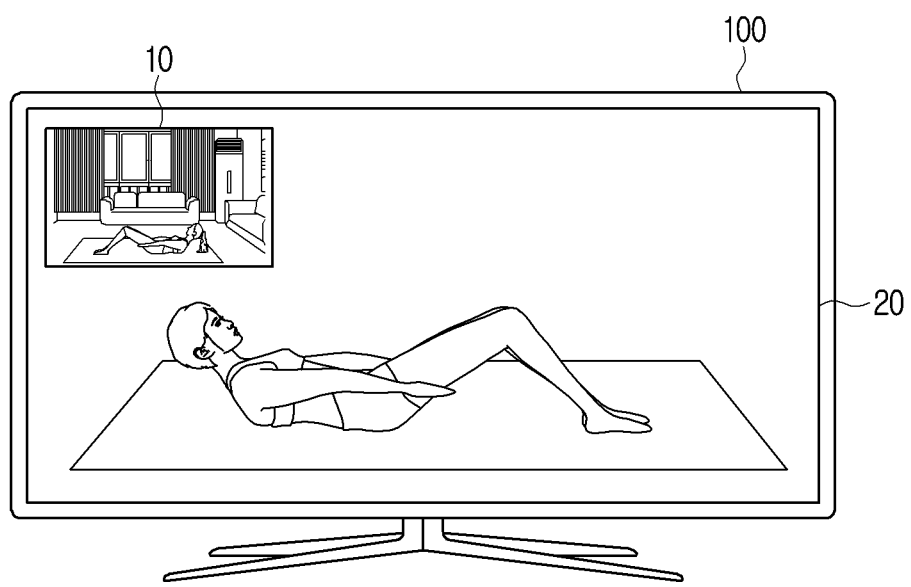
FIG. 4B is a view illustrating a first image and a second image provided in a PIP method according to an exemplary embodiment.
Figure 4C:
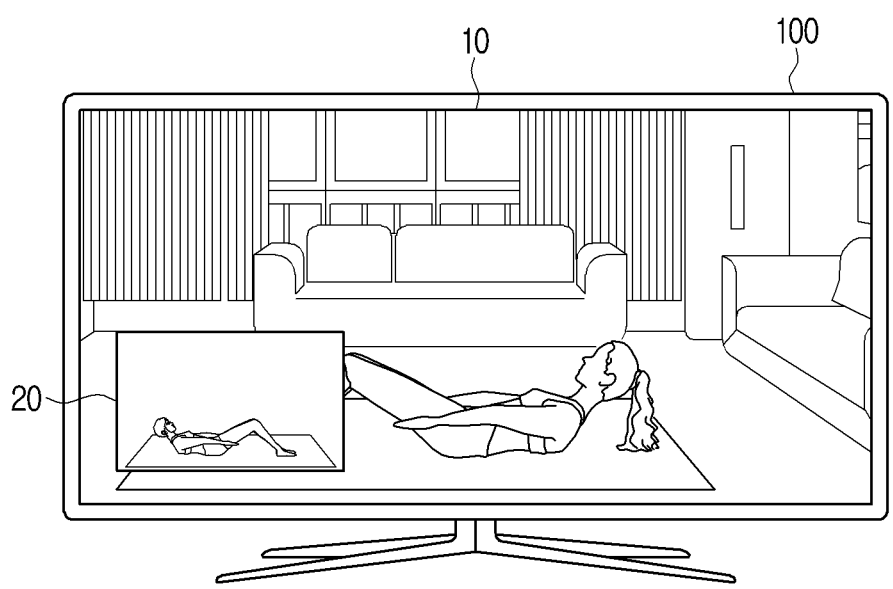
FIG. 4C is a view illustrating a first image and a second image provided in a PIP method according to an exemplary embodiment.
Figure 4D:
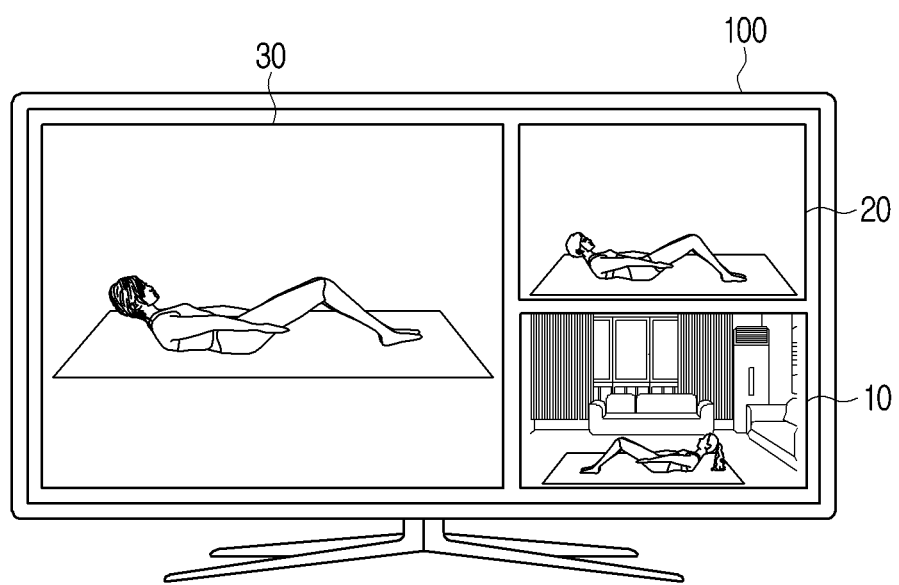
FIG. 4D is a view illustrating a plurality of application screens displayed together with an image obtained through a camera according to an exemplary embodiment.

FIGS. 4A and 4D are views depict a method of providing a plurality of images through a multi-view mode according to an exemplary embodiment.

FIG. 4A is a view illustrating that the first image and the second image are provided in a PBP method according to an exemplary embodiment. The electronic apparatus 100 may divide a display screen into two areas, and display the first image 20 provided by the first application and the second image 10 obtained through a camera in different areas as illustrated in FIG. 4A.

FIGS. 4B and 4C are views illustrating that the first image and the second image are provided in a PIP method. As illustrated in FIG. 4B, the electronic apparatus 100 may display the second image 20 on the entire display screen and may display the first image 10 by overlapping a portion of the second image 20. Alternatively, as illustrated in FIG. 4C, the electronic apparatus 100 may display the first image 10 on the entire display screen, and display the second image 20 by overlapping a portion of the first image 10.

In other words, in a multi-view mode according to an exemplary embodiment, a display screen may be divided in various methods as illustrated in FIGS. 4A to 4C and two images may be provided. Such display methods may be preset by a user.

FIG. 4D is a view illustrating that an image obtained through a camera is displayed together with a plurality of application screens according to an exemplary embodiment.

According to an exemplary embodiment, a plurality of application screens may be displayed simultaneously in a multi-view mode. In other words, referring to FIG. 4D, the electronic apparatus 100 may display the third image 30 provided by an application different from the first application together with the first image 20 provided by the first application and the second image 10 obtained through a camera in a PBP method.

Figure 5:
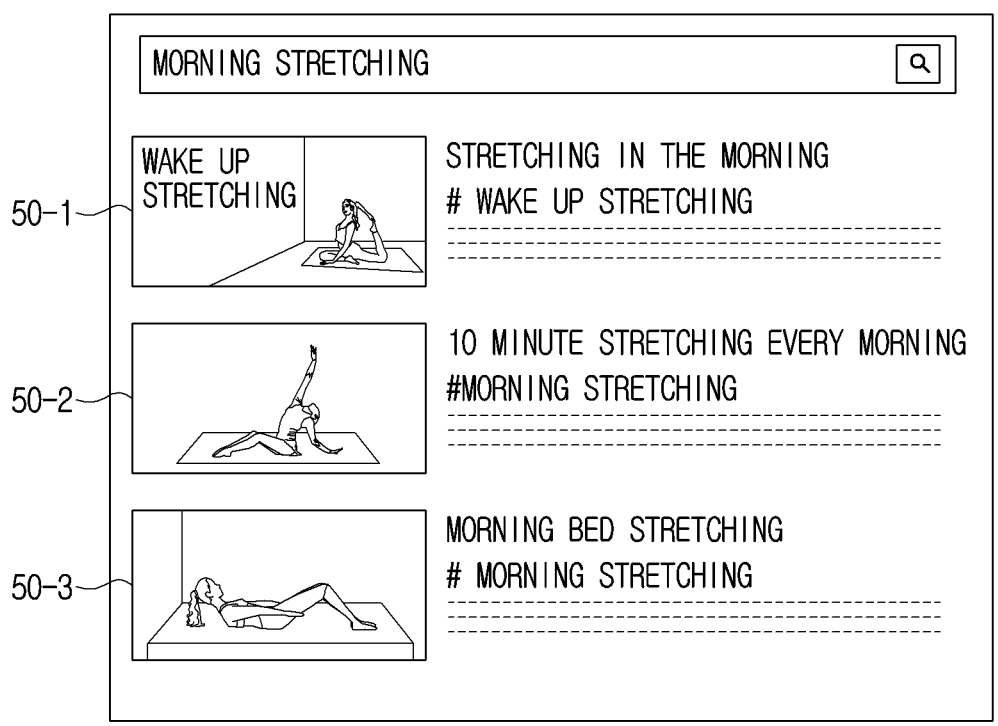
FIG. 5 is a view depicting a method of performing a search through an application according to an exemplary embodiment.

FIG. 5 is a view depicting a method of performing a search through an application according to an exemplary embodiment.

When entering the first mode according to an exemplary embodiment, the electronic apparatus 100 may display the second image obtained through a camera together with the first image provided through the first application related to the first mode on the display 120.

While the first image and the second image are displayed, when a user input for performing a search through the first application is received, the electronic apparatus 100 may perform a search using the first application.

Referring to FIG. 5, when "morning stretching" is searched for in the first application, a playlist including a plurality of images 50-1, 50-2, 50-3 corresponding to the search word may be displayed on the display 120. Subsequently, the electronic apparatus 100 may display an image selected by a user from the plurality of images 50-1, 50-2, 50-3 included in the playlist on the display 120 instead of the first image.

The electronic apparatus 100 may store a search history of "morning stretching", a time when the image selected by the user is reproduced and information regarding at least one keyword corresponding to the image selected by the user in a search word DB.

For example, when "morning stretching" is searched for through the first application, the electronic apparatus 100 may store the words "morning" and "stretching" in a search word DB as a search history. If a user input for selecting the image 50-1 regarding "stretching in the morning" from among the plurality of images 50-1, 50-2, 50-3 is received, the electronic apparatus 100 may store a time when the selected image 50-1 is reproduced, a title (stretching in the morning) of the image 50-1 and a keyword (#wake-up stretching) included in the image in a search word DB.

FIG. 5 illustrates that only the screen provided by the first application is displayed on the display 120, but the present disclosure is not limited thereto. In other words, while a search is performed in the first mode, the first application screen and the second image provided through a camera may be displayed together.

Figure 6:
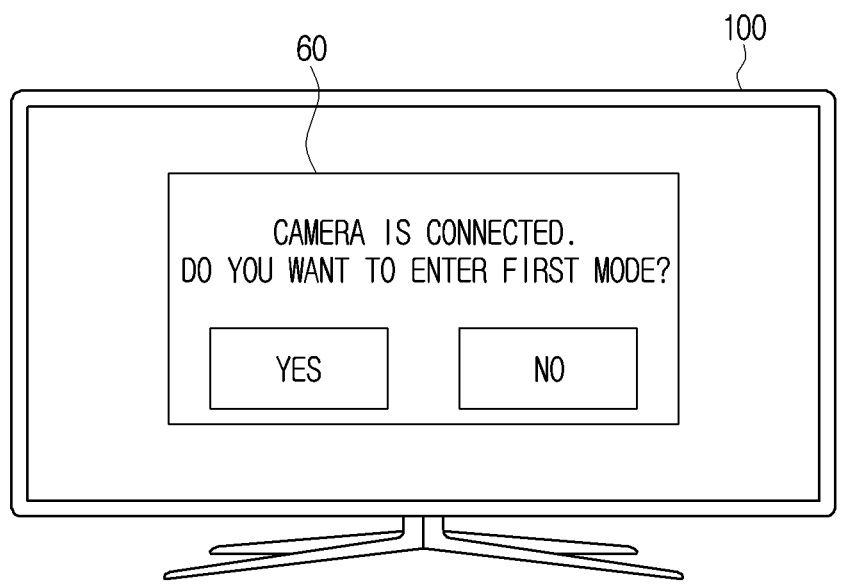
FIG. 6 is a view depicting a user interface (UI) for receiving a user input for entering a first mode according to an exemplary embodiment.

FIG. 6 is a view depicting a UI for receiving a user input for entering a first mode according to an exemplary embodiment.

According to an exemplary embodiment, when connection with a camera is established, the electronic apparatus 100 may display a UI 60 asking whether to enter the first mode. If a user input for entering the first mode is received through the UI 60, the electronic apparatus 100 may perform a search based on a search word corresponding to a user history through the first application related to the first mode, display the first image provided by the first application based on the search result of the first area of the display, and display the second image obtained through the camera on the second area of the display.

FIG. 6 illustrates that when connection with a camera is established, the UI 60 is displayed and the electronic apparatus 100 enters the first mode, but the present disclosure is not limited thereto. In other words, after connection between the electronic apparatus 100 and a camera is established, the electronic apparatus 100 may enter the first mode through a selection of an icon related to the first mode, a user's voice command for entering the first mode, a user command through an external remote controller for entering the first mode, etc.

Figure 7:
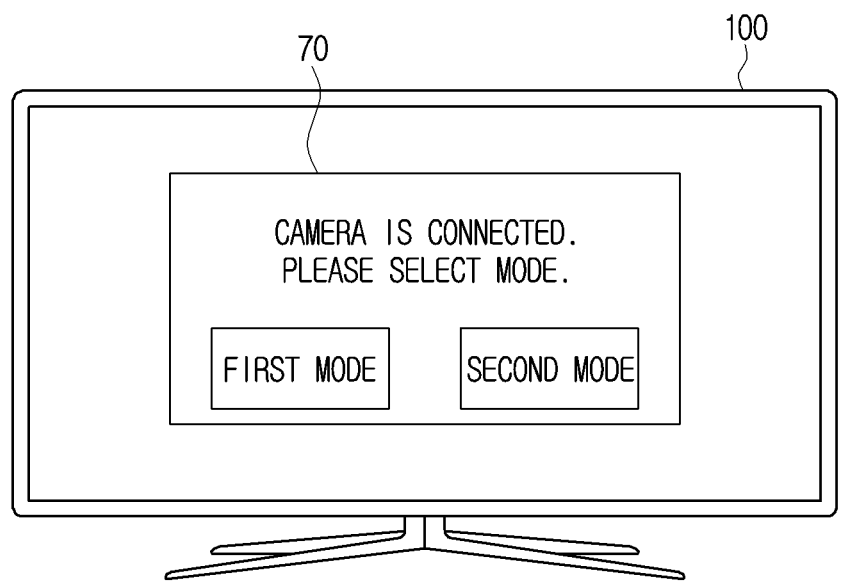
FIG. 7 is a view depicting a UI for receiving a user input for selecting a multi-view mode according to an exemplary embodiment.

FIG. 7 is a view depicting a UI for receiving a user input for selecting a multi-view mode according to an exemplary embodiment.

According to an exemplary embodiment, a multi-view mode may be implemented with a plurality of modes. For example, the first mode may be a multi-view mode for home training, and the second mode may be a multi-view mode related to dance.

According to an exemplary embodiment, when connection with a camera is established, the electronic apparatus 100 may display a UI 70 asking whether to enter the first mode or the second mode on the display. Subsequently, the electronic apparatus 100 may enter a multi-view mode corresponding to a user input through the UI 70.

For example, if a user input for entering the first mode is received, the electronic apparatus 100 may obtain a search word based on a user history of the first mode through the first application related to the first mode. The electronic apparatus 100 may display the first image provided by performing a search using the first application on the first area of the display and display the second image obtained through a camera on the second area of the display.

For example, if a user input for entering the second mode is received, the electronic apparatus 100 may obtain a search word based on a user history of the second mode through the second application related to the second mode. The electronic apparatus 100 may display the first image provided by performing a search using the second application on the first area of the display and may display the second image obtained through a camera on the second area of the display.

Here, the first application may be an application most used in the first mode, and the second application may be an application most used in the second mode. However, the present disclosure is not limited thereto, and an application to be used in the first mode and the second mode may be preset by a user.

In the first mode, a search word may be obtained based on a search history in which a user performed a search in the first mode and a viewing history in the first mode, and in the second mode, a search word may be obtained based on a search history in which a user performs a search in the second mode and a viewing history in the second mode. FIG. 7 illustrates that when connection between the electronic apparatus 100 and a camera is established, the UI 70 is displayed so that the first mode or the second mode is selected, but the present disclosure is not limited thereto. In other words, after the electronic apparatus 100 and a camera are connected, the electronic apparatus may enter the first mode or the second mode through a selection of an icon related to the first mode or the second mode, a user's voice command for entering the first mode or the second mode, a user command through an external remote controller for entering the first mode or the second mode, etc.

Figure 8:
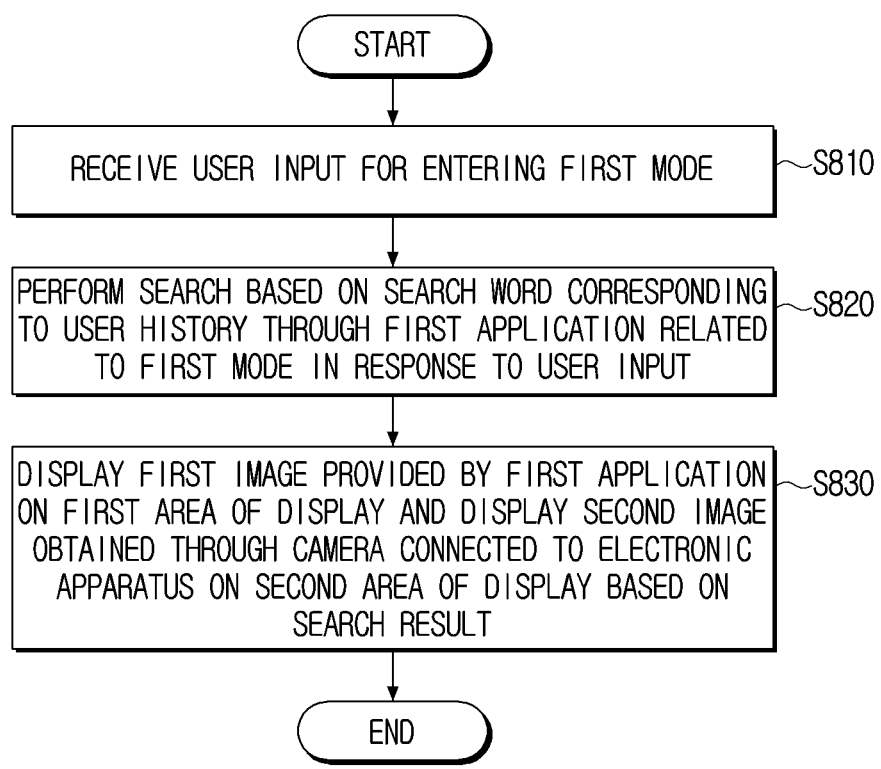
FIG. 8 is a flowchart depicting an operation of an electronic apparatus according to an exemplary embodiment.

FIG. 8 is a flowchart depicting an operation of an electronic apparatus according to an exemplary embodiment.

Firstly, the electronic apparatus 100 may receive a user input for entering the first mode (S810). The user input for entering the first mode may include various user inputs such as a user input for selecting an icon corresponding to the first mode displayed on the display of the electronic apparatus 100, a user input through a remote controller connected to the electronic apparatus 100, a user input through a user's voice command, a user input for connecting a camera to the electronic apparatus 100, etc.

When a user input for entering the first mode is received, the electronic apparatus 100 may perform a search based on a search word corresponding to a user history through the first application related to the first mode in response to the user input (S820). Specifically, the user history may include a search history and a viewing history in the first mode, and the electronic apparatus 100 may obtain a search word based on the user history of the first mode. For example, the electronic apparatus 100 may obtain a search word based on at least one keyword included in a search history in the first mode, a time when an image in a viewing history is reproduced, and at least one keyword corresponding to the image.

In addition, the electronic apparatus 100 may identify the first application from among a plurality of a plurality of applications installed in the electronic apparatus 100 based on a viewing history in the first mode. For example, the electronic apparatus 100 may identify the application most used in the first mode as the first application, or the application corresponding to the first mode may be preset by a user.

The electronic apparatus 100 may display the first image provided by the first application on the first area of the display based on a search result, and display the second image obtained through a camera connected to the electronic apparatus 100 on the second area of the display (S830). According to an exemplary embodiment, the electronic apparatus 100 may obtain a playlist including a plurality of images corresponding to a search result in the first application, and identify one of the plurality of images included in the playlist as the first image. For example, the electronic apparatus 100 may identify an image located at the top of the playlist from among the plurality of images included in the playlist as the first image. However, the present disclosure is not limited thereto, and an algorithm for identifying the first image from among the plurality of images included in the playlist may be preset by a user. For example, among the plurality of images included in the playlist, an image having the highest number of views or the highest number of recommendations may be preset to be identified as the first image.

Figure 9:
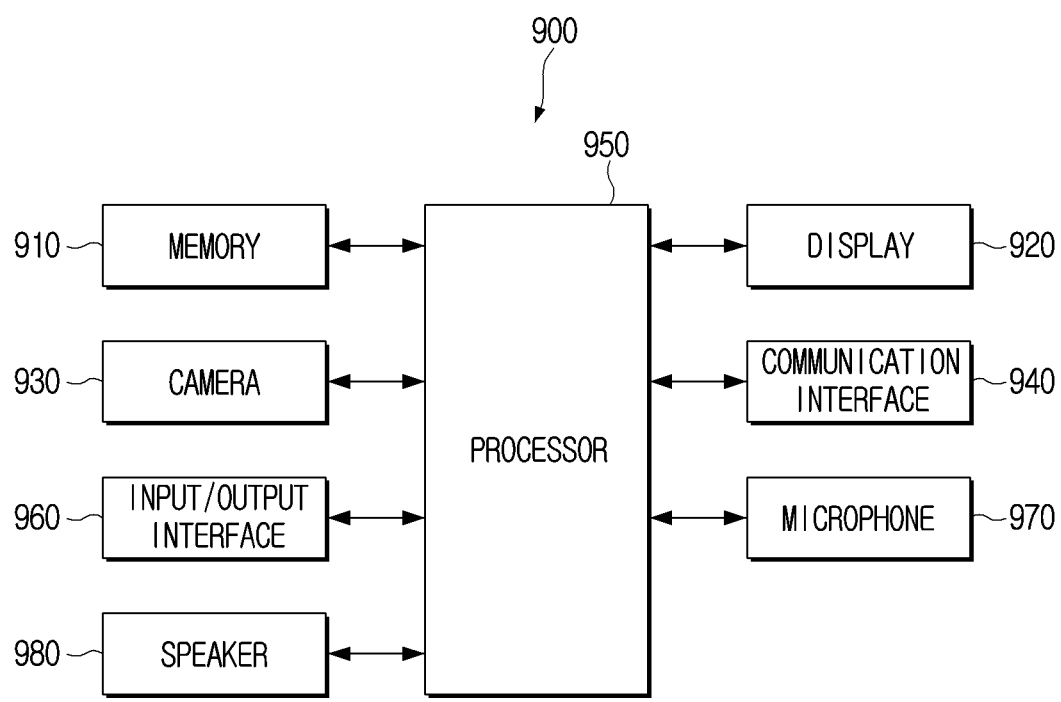
FIG. 9 is a block diagram depicting a configuration of an electronic apparatus according to an exemplary embodiment.

FIG. 9 is a block diagram depicting a specific configuration of an electronic apparatus according to an exemplary embodiment.

As illustrated in FIG. 9, an electronic apparatus 900 according to an exemplary embodiment may include a memory 910, a display 920, a camera 930, a communication interface 940, an input/output interface 960, a microphone 970, and a speaker 980. However, this is an example, and new components may be further added or some components may be omitted in implementing the present disclosure. The memory 110, the display 120, the camera 140, the communication interface 140, and the processor 150 have been described above with reference to FIG. 2 and thus, the input/output interface 960, the microphone 970 and the speaker 980 will be described hereinafter.

The input/output interface 960 may input/output at least one of audio or video signals. In particular, the input/output interface 960 may receive an image from an external apparatus capable of providing images to the display 920.

Meanwhile, the input/output interface 960 may be High Definition Multimedia Interface (HDMI), but this is only an example. The input/output interface 960 may be one of Mobile High-Definition Link (MHL), Universal Serial Bus (USB), Display Port (DP), Thunderbolt, Video Graphics Array (VGA) port, RGB port, D-subminiature (D-SUB), or Digital Visual Interface (DVI). According to an exemplary embodiment, the input/output interface 960 may include a port for inputting/outputting only audio signals and a port for inputting/outputting only video signals separately, or may be implemented as one port that inputs/outputs both audio signals and video signals.

The microphone 970 may receive an audio signal from outside. The audio signal may include a user command, and the user command may include a command for entering the first mode. However, the present disclosure is not limited thereto, and the user command may include various voice commands for controlling the electronic apparatus 900.

According to an exemplary embodiment, when a user command for entering the first mode is received from the microphone 970, the processor 950 may enter the first mode based on the input user voice. In other words, a user command according to an exemplary embodiment may be input from the microphone 970 through a user voice. Specifically, the processor 950 may receive a user voice through the microphone 970, and obtain a user command corresponding to the received user voice by performing voice recognition regarding the received user voice. More specifically, the processor 950 may receive a user voice through the microphone 970, and obtain a user command corresponding to the received user voice by inputting the received user voice to a trained artificial intelligence model. When the user command corresponding to the received user voice is obtained, the processor 950 may perform an operation corresponding to the user command as described above. In other words, the electronic apparatus 900 enters the first mode by selecting an icon on a UI for entering the first mode, but the present disclosure is not limited thereto. The electronic apparatus 900 may enter the first mode through a user voice command.

In addition, according to an exemplary embodiment, a search may be performed in the first application as a user voice is received from the microphone 970.

The speaker 980 may output audio data under the control of the processor 950. In particular, according to various embodiments, the speaker 980 may output audio data that is provided in the first image provided by the first application.

In the above exemplary embodiments, when entering a multi-view mode, an image obtained through a camera is displayed together with an image provided by an application related to the multi-view mode, but the present disclosure is not limited thereto. In other words, as illustrated in FIGS. 10A, 10B and 10C, an image provided by an application related to the multi-view mode may be displayed together with a broadcasting image provided by the electronic apparatus 100.

Figure 10A:
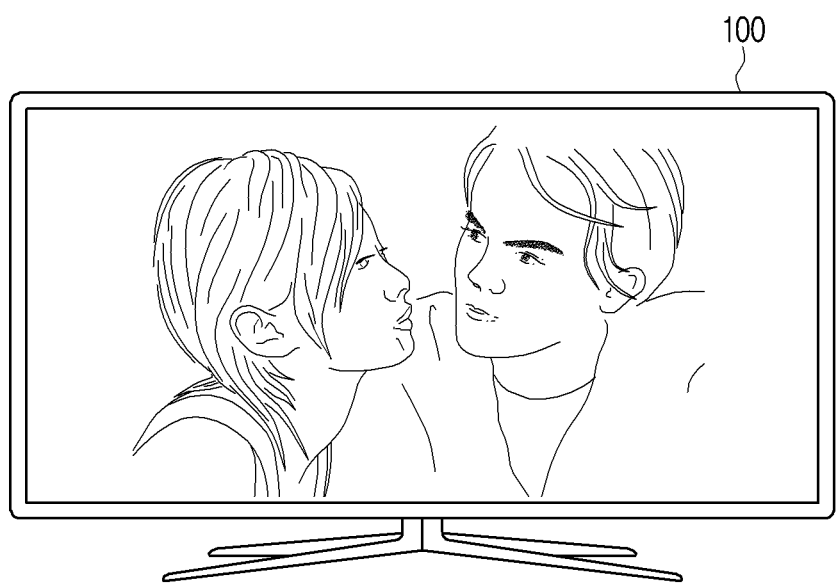
FIG. 10A is a view illustrating that a broadcasting image is displayed on a display of an electronic apparatus according to an exemplary embodiment.

FIG. 10A is a view illustrating that a broadcasting image is displayed on a display of an electronic apparatus according to an exemplary embodiment.

Specifically, referring to FIG. 10A, the electronic apparatus 100 may display a broadcasting image on the display. In other words, when the electronic apparatus 100 according to an exemplary embodiment is implemented as a TV or a smart TV, the electronic apparatus 100 may display a broadcasting image on the display.

Figure 10B:
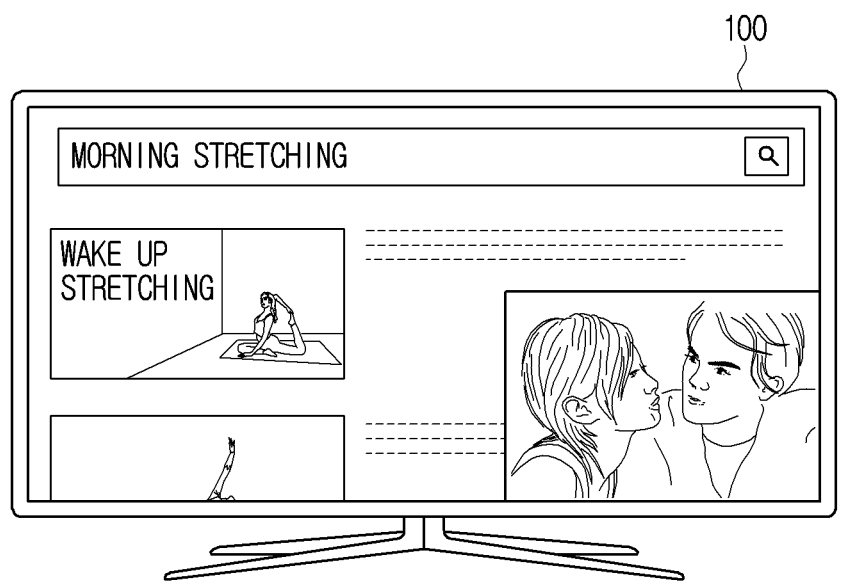
FIG. 10B is a view illustrating that a broadcasting image according to an exemplary embodiment is displayed together with a search screen according to an exemplary embodiment.
Figure 10C:
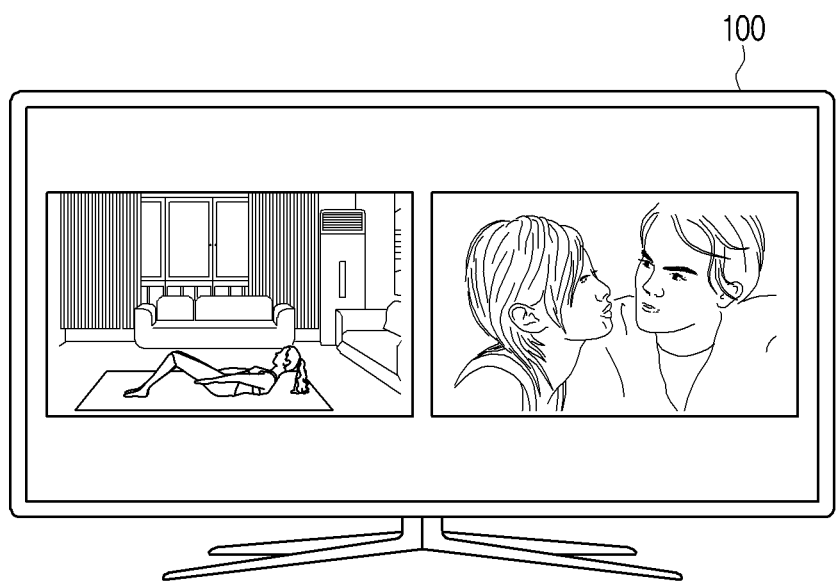
FIG. 10C is a view illustrating that an image corresponding to the search result of FIG. 10B is displayed together with a broadcasting image.

FIG. 10B is a view illustrating that a broadcasting image according to an exemplary embodiment is displayed together with a search screen according to an exemplary embodiment.

As illustrated in FIG. 10A, if a user input for entering the multi-view mode is received while a broadcasting image is displayed on the display of the electronic apparatus 100, the electronic apparatus 100 may display a search screen where a search is performed through an application corresponding to the multi-view mode together with the broadcasting image. The user input for entering the multi-view mode may include various user inputs including, for example, a user input for selecting an icon for entering the multi-view mode displayed on the display of the electronic apparatus 100, a user input through an external remote controller connected to the electronic apparatus 100, and a user input through a user's voice command.

FIG. 10B illustrates that a search screen and a broadcasting image are displayed together in a PIP method, but the present disclosure is not limited thereto. A search screen and a broadcasting image may be displayed together in a PBP method or other various methods.

FIG. 10C is a view illustrating that an image corresponding to the search result of FIG. is displayed together with a broadcasting image.

In response to the search result of FIG. 10B, the electronic apparatus 100 may display a content image corresponding to the multi-view mode together with the broadcasting image of FIG. 10A through the application corresponding to the multi-view mode as illustrated in FIG. 10C.

FIG. 10C illustrates that a content image corresponding to the multi-view mode and a broadcasting image are displayed together in a PBP method, but the present disclosure is not limited thereto. A search screen and a broadcasting image may be displayed in a PIP method or other various methods.

The present disclosure includes various exemplary embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In describing the disclosure, a detailed description of known functions or configurations incorporated herein will be omitted as it may make the subject matter of the present disclosure unclear.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

In the above-described embodiments, a UI for setting a display mode of a source that provides an image to the display 120 according to an exemplary embodiment is displayed on the display 120 in a display mode of a horizontal mode, but the present disclosure is not limited thereto. In other words, the UIs according to an exemplary embodiment may also be displayed in a display mode of a vertical mode.

The terms used in this disclosure are used merely to describe a particular embodiment, and are not intended to limit the scope of the claims. The expression of a singular includes a plurality of representations, unless the context clearly indicates otherwise.

In the disclosure, an expression "have", "may have", "include", "may include", or the like, indicates an existence of a corresponding feature (for example, a numerical value, a function, an operation, a component such as a part, or the like), and does not exclude an existence of an additional feature In the disclosure, an expression "A or B", "at least one of A and/or B", "one or more of A and/or B", or the like, may include all possible combinations of items listed together. For example, "A or B", "at least one of A and B", or "at least one of A or B" may refer to all cases (1) including at least one A, (2) including at least one B, or (3) including both at least one A and at least one.

Expressions "first", "second", and the like, used in the disclosure may indicate various components regardless of a sequence and/or importance of the components, will be used only in order to distinguish one component from the other components, and do not limit the corresponding components.

When it is mentioned that any component (e.g., a first component) is (operatively or communicatively) coupled with/to or is connected to another component (e.g., a second component), it is to be understood that any component is directly coupled with/to another component or may be coupled with/to another component through the other component (e.g., a third component).

On the other hand, when it is mentioned that any component (e.g., a first component) is "directly coupled with/to" or "directly connected to" to another component (e.g., a second component), it is to be understood that the other component (e.g., a third component) is not present between any component and another component.

An expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware.

Instead, in any context, an expression "a device configured to" may mean that the device is "capable of" together with other devices or components. For example, a "subprocessor configured (or set) to perform A, B, and C" may mean a dedicated processor (e.g., an embedded processor) for performing the corresponding operations or a generic-purpose processor (for example, a central processing unit (CPU) or an application processor) that may perform the corresponding operations by executing one or more software programs stored in a memory device In the present disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be implemented in a specific hardware.

Meanwhile, various elements and areas in the drawings are illustrated schematically. Accordingly, the technical idea of the present disclosure is not limited to the relative size or spacing in the accompanying drawings.

Meanwhile, the diverse embodiments described above may be implemented in a recording medium readable by a computer or a similar device using software, hardware, or a combination of software and hardware. According to a hardware implementation, embodiments described in the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described in the specification may be implemented by the processor itself. According to a software implementation, embodiments such as procedures and functions described in the specification may be implemented by separate software modules. Each of the software modules may perform one or more functions and operations described in the specification.

Meanwhile, the methods according to the above-described various embodiments may be stored in a non-transitory readable medium. Such a non-transitory readable medium may be mounted and used in various devices.

The non-transitory computer readable medium is not a medium that stores data for a while, such as a register, a cache, a memory, or the like, but means a medium that semi-permanently stores data and is readable by an apparatus. Specifically, the programs for performing the above-described various methods may be stored and provided in a non-transitory readable medium such as a compact disc (CD), a digital versatile disc (DVD), a hard disc, a Blu-ray disc, a universal serial bus (USB), a memory card, a read only memory (ROM), or the like.

According to an exemplary embodiment, the methods according to the various embodiments described above may be provided while being included in a computer program product. A computer program product refers to a product, and it can be traded between a seller and a buyer. The computer program product can be distributed on-line in the form of a storage medium that is readable by machines (e.g.: a compact disc read only memory (CD-ROM)), or through an application store (e.g.: Play Store™). In the case of on-line distribution, at least a portion of the computer program product may be stored in a storage medium such as the server of the manufacturer, the server of the application store, and the memory of the relay server at least temporarily, or may be generated temporarily.

Although the embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

The invention claimed is:

1. An electronic apparatus comprising:
a display;
a memory configured to store at least one instruction; and
a processor configured to control the electronic apparatus by executing the at least one instruction stored in the memory,
wherein the processor is configured to:
receive a user input for entering a first mode, the first mode being a multi-view mode for simultaneously displaying an image obtained through a camera connected to the electronic apparatus, and a screen provided by an application of the electronic apparatus;
in response to the user input, perform a search, by a first application related to the first mode, based on a search word corresponding to a user history in the first mode, the first mode operable apart from the first application;
based on a result of the search, display a first image provided by the first application on a first area of the display; and
control the display to display, on a second area of the display, a second image obtained through the camera.

2. The electronic apparatus as claimed in claim 1, wherein the user history comprises at least one of a search history and a viewing history of a user in the first mode;
wherein the processor is further configured to obtain the search word based on the user history in the first mode.

3. The electronic apparatus as claimed in claim 2, wherein the processor is further configured to obtain the search word based on at least one of:
at least one keyword included in the search history,
a time when an image in the viewing history is reproduced, and
at least one keyword corresponding to the image.

4. The electronic apparatus as claimed in claim 2, wherein the processor is further configured to identify the first application from among a plurality of applications installed in the electronic apparatus based on the viewing history of the user in the first mode.

5. The electronic apparatus as claimed in claim 1, wherein the processor is further configured to:
obtain a playlist including a plurality of images corresponding to the search word by performing a search with the search word in the first application; and
identify one image from among the plurality of images included in the playlist as the first image.

6. The electronic apparatus as claimed in claim 1, wherein the processor is further configured to control the display to display a third image provided by another camera connected to the electronic apparatus on a third area that is different from an area of the display where the first image and the second image are displayed.

7. The electronic apparatus as claimed in claim 2, wherein the processor is further configured to, based on a user input for executing a plurality of applications being received while operating in the first mode, control the display to display a screen provided by a second application that is different from the first application on a fourth area that is different from an area of the display where the first image and the second image are displayed.

8. The electronic apparatus as claimed in claim 7, wherein the processor is further configured to, when the screen provided by the second application is displayed on the fourth area, stop displaying the second image and display a fourth image provided by the second application on the fourth area based on the result of the search.

9. The electronic apparatus as claimed in claim 1, wherein the processor is configured to:
  based on a user input for entering a second mode being received, perform a second search with a search word corresponding to a user history in the second mode in a third application related to the second mode; and
  based on a result of the second search, control the display to display an image provided by the third application on the first area and display the second image on the second area.

10. A method for controlling an electronic apparatus, the method comprising:
  receiving a user input for entering a first mode, the first mode being a multi-view mode for simultaneously displaying an image obtained through a camera connected to the electronic apparatus and a screen provided by an application of the electronic apparatus;
  performing, in response to the user input, a search, by a first application related to the first mode, based on a search word corresponding to a user history in the first mode, the first mode operable apart from the first application;
  displaying on a first area of a display, a first image provided by the first application based on a result of the search; and
  displaying, on a second area of the display, a second image obtained through the camera.

11. The method as claimed in claim 10, wherein the user history comprises at least one of a search history and a viewing history of a user in the first mode; and
  wherein the performing the search comprises obtaining the search word based on the user history in the first mode.

12. The method as claimed in claim 11, wherein the obtaining of the search word is based on at least one of:
  at least one keyword included in the search history,
  a time when an image in the viewing history is reproduced, and
  at least one keyword corresponding to the image.

13. The method as claimed in claim 11, wherein performing the search comprises identifying the first application from among a plurality of applications installed in the electronic apparatus based on the viewing history in the first mode.

14. The method as claimed in claim 10, wherein displaying the first image comprises:
  obtaining a playlist including a plurality of images corresponding to the search word by performing the search through the search word in the first application; and
  identifying one image from among the plurality of images included in the playlist as the first image.

15. The method as claimed in claim 10, further comprising:
  displaying, on a third area, a third image provided through another camera connected to the electronic apparatus, the third area being different from an area of the display where the first image and the second image are displayed.

16. An electronic apparatus comprising:
  a display;
  a memory configured to store at least one instruction; and
  a processor configured to control the electronic apparatus by executing the at least one instruction stored in the memory,
  wherein the processor is configured to:
    receive a user input for entering a first mode;
    based on the user input, obtain a search word based on a search history and viewing history of a user while operating in the first mode;
    identify a first application from among a plurality of applications based on the viewing history of the user while operating in the first mode;
    identify a first image from among a plurality of images provided by the first application based on the search word; and
    control the display to display the first image on a first area of the display, and a second image obtained through a camera connected to the electronic apparatus on a second area of the display.

* * * * *